Dec. 1, 1931. N. SANDOR 1,834,646
APPARATUS FOR PRODUCING FOAM IN FINE BUBBLES
Filed Oct. 27, 1927
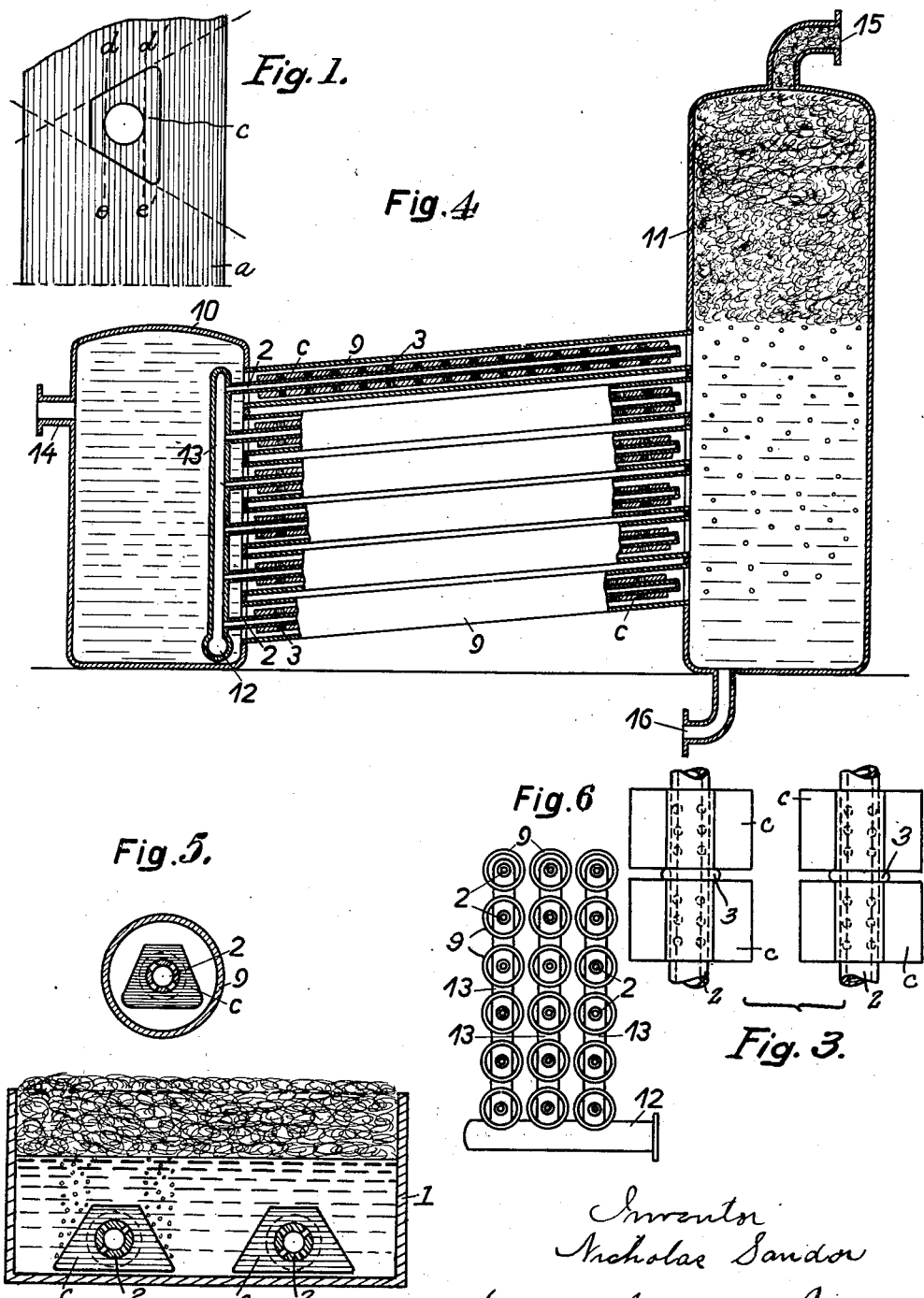

Patented Dec. 1, 1931

1,834,646

UNITED STATES PATENT OFFICE

NICHOLAS SANDOR, OF DRESDEN, GERMANY

APPARATUS FOR PRODUCING FOAM IN FINE BUBBLES

Application filed October 27, 1927, Serial No. 229,087, and in Germany November 3, 1926.

This invention relates to apparatus for the production of foam in fine bubbles and particularly to a nozzle or gas diffuser for use in such apparatus.

The present application deals with producing in a technically and economically satisfactory manner foam in fine bubbles, the gaseous constituent of the foam being usually air or another gas or a liquid converted into gas (such as benzine if used as a fuel in combustion engines).

While soap lather is produced by stirring or beating and other chemical foam for fire extinguishing purposes by causing chemical agents to act on each other the production of a relatively lasting foam consisting of fine bubbles and containing a very slight amount of liquid takes place according to the present invention by introducing into the foam-forming liquid the gaseous constituent of the foam under pressure and in finest distribution. In this manner it becomes possible to produce in a very short time any quantity of foam by means of relatively simple devices either in the open air or in a closed pressure vessel whence it can be guided through pressure piping to the point of use owing to its constituting a combination of liquid and gas as stated before.

The foam is tenacious and lasting, and these features can be still more enhanced by adding slime-forming substances such as sugar and gelatinous substances in very small quantities.

According to the present invention a multiplicity of fine, porous nozzles is employed to blow the gaseous constituent into the liquid. Suitable nozzles are offered by nature in the form of the vascular tissue found in thin wooden bodies. As in wooden plates cut rectangularly to the direction of the fibres the pores are too close together, wooden bodies are preferably cut so that the discharge surface is arranged obliquely to the direction of the fibres, linden wood grown on stone having proved to be particularly suitable. The last-mentioned arrangement can be profitably used for producing foam on a large scale by employing a boiler of the type to be explained with reference to the accompanying drawings.

In the accompanying drawings—

Figure 1 is a diagrammatical illustration of the manner of producing the present nozzle or diffuser;

Figure 2 is a sectional view of one form of apparatus;

Figure 3 is a plan view of the diffusers shown in Fig. 2;

Figure 4 is a longitudinal sectional view in a vertical plane of a still further form of apparatus.

Figure 5 is a transverse section of one of the tubes shown in Fig. 4; and

Figure 6 is an end elevation of the tubes shown in Fig. 4.

Figure 1 illustrates the nature of the fine porous nozzles consisting of wooden bodies, $a$ being the longitudinal section of a trunk, in which the direction of the vascular tissue is indicated by vertical and longitudinal hatching. If the bodies or blocks $c$ are cut from the wood with the faces of the blocks at an angle to the axes of the pores of the wood, the distance between the pores will be increased sufficiently to prevent a confluence of the currents of air issuing from the pores. In the perforated body $e$ only those vascular tissues become effective that lie between the tangents $d$—$e$, $d'$—$e'$, of the bore.

Figures 2 and 3 refer to a simple open foam producer, the vessel 1 containing the foam-forming liquid being provided with the systematically perforated pipes 2 on which the wooden bodies $c$ packed by the rubber rings 3 are arranged. The gaseous constituent is supplied to the pipes 2 under pressure, whereupon, within their effective radius, the wooden bodies will emit bubbles which are converted into foam bubbles while rising.

By using a type of nozzle such as herein described, devices can be produced for obtaining foam in large quantities. An example of such a device is the foam boiler shown in Figs. 4 to 6 and resembling a sectional boiler as indicated by the longitudinal section Fig. 4. Obliquely rising pipes 9 connect the water chamber 10 with the foam chamber 11. In the pipes 9 are arranged the pipes 2 provided with the blocks c and their packing rings 3, the blocks being of the type shown in Fig. 3. On their right-hand end the pipes 2 are closed while on their left-hand end they are connected with the system of distributing piping partly shown in Fig. 6. A main cross pipe 12 supplies the gaseous agent and permits it to enter the vertical pipes 13 with which the pipes 2 are connected. The foam-forming liquid is introduced into the water chamber 10 at 14. Owing to pressure drop and buoyancy the foam produced in the pipe 9 follows towards the foam chamber 11 where specific gravity causes the wet foam to settle while the balance of the foam gets drier during its upward movement and rises towards the pressure piping 15 which guides it to the point of use.

I claim:—

1. In a device for the production of fine bubble foam, the combination of a container for foam forming liquid with a nozzle disposed therein, said nozzle being formed of a body of wood, the pores of the wood constituting the outlet openings of the nozzle, a passage in said body for supplying gas to said pores, the faces of said nozzle at which the outlet pores terminate being disposed at an angle to the longitudinal axes of said pores, and said faces being arranged to converge upwardly so as to prevent confluence of gas currents issuing from said pores.

2. In a device for the production of fine bubble foam, the combination of a container for foam-forming liquid with a nozzle disposed therein, said nozzle being formed of a body of wood with the pores of the wood constituting the outlet openings of the nozzle, a perforated pipe extending into said body of wood for supplying gas through said perforation to said pores, the faces of said nozzle at which the outlet pores terminate being disposed at an angle to the longitudinal axes of said pores, and said faces being arranged to converge upwardly so as to prevent confluence of currents of gas issuing from said pores.

NICHOLAS SANDOR.